US008565163B2

United States Patent
Wan et al.

(10) Patent No.: US 8,565,163 B2
(45) Date of Patent: Oct. 22, 2013

(54) METHOD FOR CONTROLLING SWITCH OF MOBILE USER EQUIPMENT (UE)

(75) Inventors: Bin Wan, Beijing (CN); Yanglin Zhou, Beijing (CN); Zhongliang Miao, Beijing (CN)

(73) Assignees: Legend Holdings Ltd., Beijing (CN); Lenovo (Beijing) Limited, Beijing (CN)

( * ) Notice: Subject to any disclaimer, the term of this patent is extended or adjusted under 35 U.S.C. 154(b) by 998 days.

(21) Appl. No.: 12/146,074

(22) Filed: Jun. 25, 2008

(65) Prior Publication Data

US 2009/0005055 A1    Jan. 1, 2009

(30) Foreign Application Priority Data

Jun. 28, 2007 (CN) .......................... 2007 1 0118088

(51) Int. Cl.
*H04W 4/00*    (2009.01)
(52) U.S. Cl.
USPC .......................................................... 370/329
(58) Field of Classification Search
USPC .................................. 455/436, 450; 370/329
See application file for complete search history.

(56) References Cited

U.S. PATENT DOCUMENTS

| 6,243,568 | B1 * | 6/2001 | Detlef et al. ............... 455/226.4 |
| 7,333,451 | B1 * | 2/2008 | Khalil et al. .................. 370/331 |
| 7,606,200 | B2 * | 10/2009 | Kwak et al. .................... 370/331 |
| 7,649,867 | B2 * | 1/2010 | Kim et al. ...................... 370/331 |
| 7,738,871 | B2 * | 6/2010 | Olvera-Hernandez et al. ............................. 455/436 |
| 2006/0121903 | A1 * | 6/2006 | Lee et al. ...................... 455/439 |
| 2007/0110075 | A1 * | 5/2007 | Olvera-Hernandez ... 370/395.52 |
| 2007/0112995 | A1 * | 5/2007 | Manula et al. ................ 710/310 |
| 2007/0224988 | A1 * | 9/2007 | Shaheen ....................... 455/436 |
| 2008/0039090 | A1 * | 2/2008 | Jin et al. ........................ 455/436 |
| 2008/0069065 | A1 * | 3/2008 | Wu et al. ....................... 370/340 |

* cited by examiner

*Primary Examiner* — Derrick Ferris
*Assistant Examiner* — Majid Esmaeilian
(74) *Attorney, Agent, or Firm* — Sills, Cummis & Gross P.C.

(57) ABSTRACT

The present invention discloses a method for controlling switch of multi-mode mobile user equipment (UE). Through designing a dedicated Switch Control Module (SCM) in the existing terminal management module within the multi-mode UE supporting IMS services, utilizing the automatic detection function of the Access Service Network (ASN) at the terminal side, and modifying part of the control signaling of the Connectivity Service Network (CSN) at the terminal side to make the UE participate the switch control procedure actively, the invention implements the seamless switch between different networks, strengthening the real-time performance during the network switch, thus enabling the mobile multimedia service to continue to satisfy the requirements for the real-time performance even when switched in use and enabling the user to obtain quicker data transmission rate, better quality of service and service with a cheaper price.

5 Claims, 4 Drawing Sheets

METHOD FOR CONTROLLING SWITCH OF MOBILE USER EQUIPMENT (UE)

BACKGROUND OF THE INVENTION

1. Field of Invention

The present invention relates to the switch technology in the wireless communication, in particular to a method for switching of multi-mode mobile user equipment (UE) and IMS (IP Multimedia Subsystem) terminal between 3rd Generation Mobile Communication (3G) system and World Interoperability for Microwave Access (WiMAX) system.

2. Description of Prior Art

Recently, mobile communication has been the focus of the communication technology research at all times. With the 3G system entering the commercial operation stage gradually, the service requirements for more abundant content and higher service quality have been raised based on the capability of UE for providing conventional mobile voice and short message service and narrowband data service. As a result, it is required that the UE has the capability of interacting with various networks with different modes, and that UE is enabled to support mobile multimedia services.

At present, the main differences between UE in 3G system and that in most of the prior 2G systems are embodied in: the increase of speed in the voice and data transmission, the capability of the UE in 3G system for processing the media of various forms, such as image, music, video stream, etc., providing various information services including web page browsing, telephone meeting, electronic commercial, etc. However, in order to provide such multimedia services, mobile communication network must have the capability of supporting different data transmission rates. Normally, the network in the indoor, outdoor and driving environment is required to support at least the rate of 2 Mbps (megabyte per second), 384 kbps (kilobyte per second) and 144 kbps, respectively. However, in comparison with accessing the mobile communication network by the UE and using the broadband multimedia services provided by it, accessing the fixed network by the UE and using the broadband multimedia services has obvious advantages in the aspects of bandwidth, stability and price undoubtedly.

The mobile multimedia service with high real-time requirement in the UE services is the presently accepted so-called next killer application in the industry. As such, 3GPP first raised IP Multi-media Subsystem (IMS) mobile terminal technology in the R5 (Release 5) version in June 2002, and kept on improving its application standards in the subsequent R6 and R7 versions. 3GPP constituted IMS as the core technical standard of the 3G system at first, and now IMS has been accepted by ITU-T and ETSI and has been incorporated into the core standard framework of Next Generation Network (NGN), which is believed to be the important technical basis for realizing the future fixed/mobile network combination (FMC), in which FMC is the technology providing communication services by combining fixed and wireless technology.

As the multi-mode UE in 3G system is able to implement mobile services through various wireless access network systems in various application environments, the terminal providers and network devices manufacturers need to support the switch of the UE that can implement IMS service between various wireless network systems to obtain the services with quicker data transmission rate, better quality of service (QoS) and cheaper price and to make the users not to feel the interruption and stall in the multimedia communication services, that is to say, to realize seamless switch. The common wireless access networks include: Wi-Fi, also represented as WLAN, utilizing IEEE 802.11 series protocols, WiMAX system utilizing IEEE 802.16 series protocols, ultra-wideband (UWB) technology, Universal Mobile Communication System (GSM), Wideband Code Division Multiple Access (WCDMA), Code Division Multiple Access 2000 (CDMA2000) system, etc.

At present, the FMC technology receives much concern, and the WiMAX technology having the properties of the wireless MAN is believed to be the powerful weapon of the fixed network for the competition with the 3G technology by providing and extending the wireless broadband access service. WiMAX is also called Broadband Wireless Access (BWA), which is the IEEE 802.16 standard constituted by IEEE, belonging to the WMAN technology which is a new air interface raised for the microwave and millimeter-wave band for connecting the WLAN wireless access point to Internet, connecting company and home LAN to wired backbone line, and being the wireless extending technology for the cable line and xDSL to realizing wireless broadband access.

As the antenna of the WiMAX system with the properties of the wireless MAN has the coverage radius up to 30 miles with its data rate up to 70 Mbps, which have the obvious advantages in the aspects of the network coverage cost and bandwidth compared with the 3G system, and the WiMAX system can be combined with the existing 3G system in the future 4G mobile communication stage, how the UE supporting IMS services switches seamlessly between the 3G system and the WiMAX system is subject to the attention of the industry presently.

In the prior art, the switch mechanisms between different networks primarily start from the core network (CN), with the relatively complex procedure, long communication time, and switch quality difficult to be guaranteed, thus causing the problems of long switch time, more occupied resource, etc. For the IMS services which are very sensitive to the real-time property and the resource occupation, it is also very necessary to find a simple, convenient and practical switch scheme.

FIG. 1 is a schematic diagram of a loose coupling interactive manner between the WiMAX system of the prior art and the 3GPP core network. As shown in FIG. 1, the thought of the proposal is: on the basis that the IMS service is the technology over all-IP, designing a control protocol between the WiMAX system service providing device and the 3GPP core network for negotiating to call the IMS data in the respective servers in Internet, changing the IMS data transmission path by the respective control signaling to implement the switch between the 3G system and the WiMAX system. It is called the loose coupling manner, because the proposal adopts the negotiation in the step of IMS data source control, while the access layer and even the mobile terminal only participate the data transmission passively. With this coupling manner, in order to realize the IMS data control negotiation between the 3G system and the WiMAX system, it is needed to make a more complex design for the control protocol between the WiMAX system service providing device and the 3GPP core network (represented as dashed line in FIG. 1), with its access layer and mobile terminal part not participating switch control but conducting dual-link switch in term of control signaling passively. As such, in operation, the control signal interaction between the system network elements is relatively complex, the switch time is relatively long, and the real-time performance is relatively poor.

The technology related to the switch between the 3G system and the WLAN system and the switch technology of the user terminal within the WiMAX system are conventional technologies. However, these conventional technologies don't relate to the technology of participating the switch control by the UE, and the technical schemes all let the network side to be the leading role in the switch control and let the UE only receive the control signaling from the network side and conduct dual-link switch passively. Thus, how to enable the multi-mode UE to participate the active switch control flow between different networks or even to lead the switch control between different networks for realizing the further improvement of the switch efficiency is a problem to be solved at present.

SUMMARY OF THE INVENTION

In view of the above problems, the present invention aims to provide a method for enabling a mobile UE to participate in the switch control process, which can enable the seamless switch of the multi-mode UE between the 3G system and the WiMAX system and improve the efficiency of the inter-network switch and the quality of system service.

In order to achieve this object, the technical scheme of the invention is implemented as follows:

A method for controlling switch of a mobile UE is provided. In the method, it is provided with a dedicated switch control module SCM. The method comprises the following steps of:

a. listing into the activation set by the UE the identification of the base station of the second communication system of which the signal quality reaches that of the first communication system; deciding whether there is at least one base station of the second communication system in the activation set of which the signal quality is better than that of the signal of the first communication system and whether the duration of the signal quality reaches a half of a predetermined trigger period, if yes, then performing step b; otherwise continuing to detect the signal periodically and returning to step a;

b. deciding whether the signal quality of the base station of the second communication system detected by the SCM is better than that of the signal of the base station of the first communication system and the duration of the signal quality reaches a specified trigger period, if yes, then transferring all the switch control rights from the terminal management module to the SCM, preparing the buffer resources by the SCM, and performing step C; otherwise continuing to detect the signal periodically and returning to step b;

c. triggering and completing the switch by the SCM, releasing the occupied public resources in time by the SCM after the end of the switch, and relieving the control for all the modules related to the switch.

Wherein, said SCM is set in the TCP layer of the IMS mobile terminal protocol; and the SCM completes the switch with the help of the control effect of the terminal IP resource management module of the IMS mobile terminal protocol IP layer and the detection effect of the signal strength automatic detection module of the access layer stack.

Wherein, said step a generally comprises:

a1. detecting by the UE the signal of the base station of the second communication system, saving into the activation set the identification of the base station of the second communication system of which the signal quality is higher than that of the first communication system, if there already is at least one identification of the base station of the second communication system in the activation set and the signal quality of the base station of the second communication system is higher than that of the signal of the first communication system and the duration reaches a half of a specified trigger period, then triggering the SCM into a predetermined SCM flow;

a2. informing the SCM about the obtained address of the base station of the second communication system which has the optimum signal, and selecting the address of the base station of the second communication system which has the optimum signal by the SCM;

a3. receiving by the SCM the downlink signal of said base station in step a2, keeping a record and making a comparison, deciding whether the signal keeps good or is strengthened continuously, if yes, then process step a4; otherwise return to step a2;

a4. informing the base station of the second communication system which has the optimum signal to reserve the switch buffer by the SCM, beginning to monitor the switch buffer of the UE and the operation of the switch control processor in the UE by the SCM, and recording the buffer size and to what extent that the processor operation is busy.

Wherein, in said step b, the transferring all the switch control rights from the terminal management module to the SCM generally comprises:

b1. sending control signaling from the SCM to the switch buffer of the UE to ask for reserve the space needed by the switch;

b2. deciding whether the switch buffer space is sufficient by the SCM, if the buffer space of the UE is not sufficient, then performing step b3; if it is sufficient, then performing step b4;

b3. informing the CPU in charge of the switch control to increase the buffer space set in memory by the SCM immediately, and returning to step b1;

b4. informing the processor in charge of the switch operation to prepare the switch of the UE by the SCM;

b5. upon receiving the ready signal from the base station to be switched and the feedback signal from the processor in charge of the switch, performing step b6;

b6. after the base stations at the UE side and the network side have completed the switch preparation, entering the switch stage.

Wherein, in said step c, the triggering and completing the switch by the SCM generally comprises:

c1. activating the switch function of the processor by the SCM and saving the related information generated in the switch into the buffer;

c2. sending the switch request from the SCM to the new Foreign Agent currently waiting for registration and entrance, and returning the switch reply message including the new care-of address CoA from the new FA to the SCM;

c3. sending the registration request message from the SCM to the new FA to register the new CoA, returning the registration reply message from the new FA which received the registration request message to the SCM, setting up the new link, beginning to transfer packets through the new link and continuing to transfer packets though the old link by the new FA;

c4. after receiving the registration reply message returned from the new FA to the SCM, knowing that the new link has been set up successfully by the SCM, sending the registration acknowledgement message from the SCM to the original FA to request to cancel the binding with the original CoA, canceling the binding with the original CoA and send the cancellation reply message from the original FA to the SCM upon receiving the registration acknowledgement message;

c5. after receiving the cancellation reply message from the original FA to the SCM, disconnecting the old link and only receiving the packets on the new link by the SCM, send the deletion request from the SCM to the original FA, and deleting the information related to the UE by the original FA.

Wherein, said first communication system is the 3G system and said second communication system is the WiMAX system; or otherwise, said first communication system is the WiMAX system and said second communication system is the 3G system.

Through designing a dedicated Switch Control Module (SCM) in the existing terminal management module within the multi-mode UE supporting IMS services, and through controlling UE to participate actively the switch control flow by the SCM module, the method for controlling switch of multi-mode mobile terminal provided by the invention enables the coupling manner between the 3G core network and the WiMAX system to change from the loose coupling to the tight coupling. The method of the invention has the following advantages and characteristics.

1) As it is set in the predetermined SCM flow the operation of participating the switch control by the UE, the system resource of the UE for the switch can be closely controlled by the SCM based on the characteristic that the IMS service has high requirements for the real-time performance, thus increasing the coupling degree in the switch system, while it is not necessary to trigger the SCM module for the applications which have low requirements for the real-time performance, thus keeping its loose coupling property.

2) According to the invention, the switch preparation status of the UE is divided into three levels in the pre-switch automatic detection stage according to the detected resource to be used in the hierarchical parameter usage flow, thus facilitating the close management for the switch resource of the UE and increasing the switch efficiency and the switch success rate of the SCM.

3) According to the invention, the control signaling is sent directly by the SCM to conduct the system resource switch in the third level of the switch preparation status, thus deducing the time required by the switch.

4) According to the invention, the public resource occupied during the switch is quickly released by the SCM to make the UE enter the status before the switch quickly and to help the UE to start the next switch, thus shortening the switch period.

5). Through further adding other functions related to the switch, such as the switch between 3G/WiFi systems, the SCM of the invention can be more extensible; at the same time, the applications that have low requirements for the real-time performance are coordinated when used by the designed control signaling according to the invention, thus still retaining the compatibility with the scheme proposed by the WiMAX forum.

6). The idea of the invention extends from the point of view of letting the mobile terminal participate the switch, realizing the combination of the two technologies of 3G/WiMAX systems in the 4G stage, i.e., the broadband wireless access on the 4G level.

DETAILED DESCRIPTION OF PREFERRED EMBODIMENTS

The core idea of the invention is: setting additionally a dedicated switch control module, i.e., SCM, in the multi-mode UE supporting IMS services, utilizing the automatic detection function of the Access Service Network (ASN) at the terminal side, and modifying part of the control signaling between the Connectivity Service Network (CSN) at the terminal side and the ASN to make the UE participate in the switch control procedure actively, thus implementing the seamless switch of the UE between different systems, reducing the switch delay, and enhancing the real-time of the network switch.

The method according to the invention is applicable between any two communication systems, and the method of the invention will be further described with reference to the figures and the detail embodiments with the switch between the 3G system and the WiMAX system only used as a example.

Figure 1:
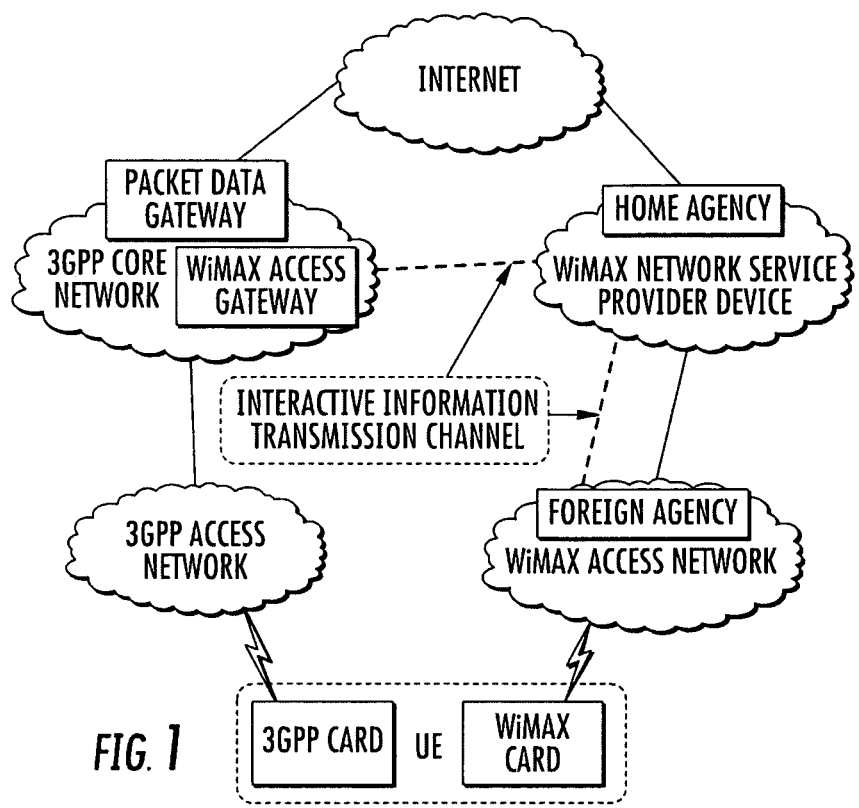
FIG. 1 shows a schematic diagram for the loose coupling manner between the WiMAX system and the 3GPP core network of the prior art.
Figure 2:
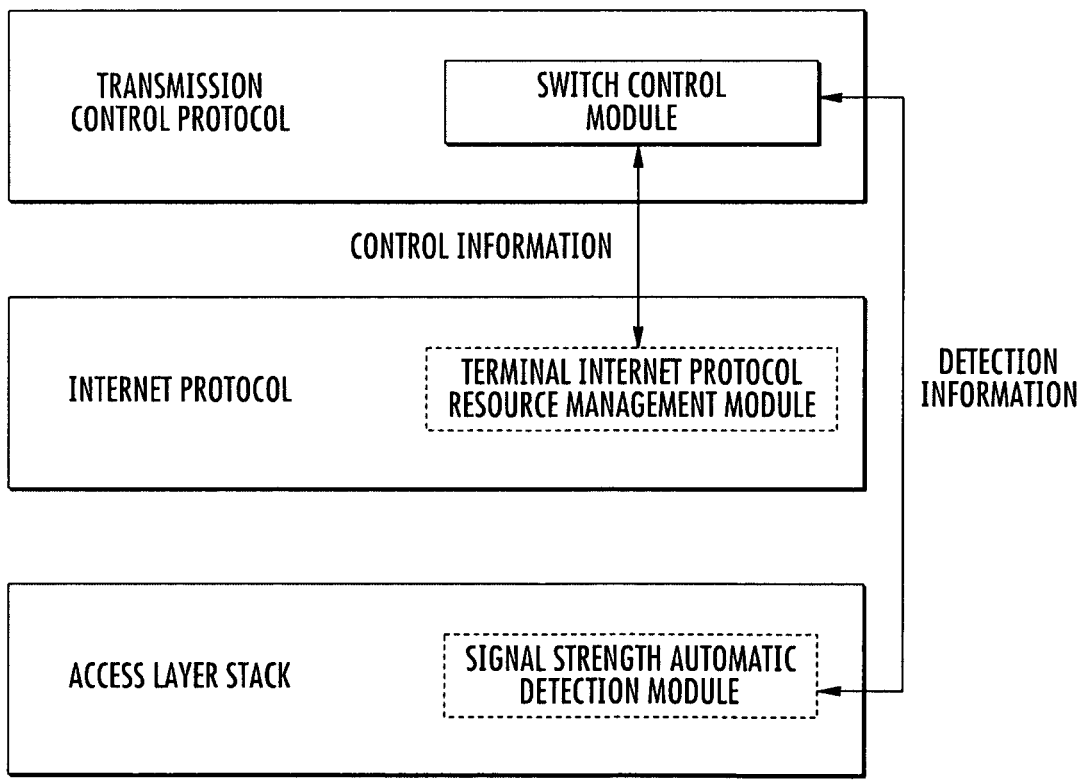
FIG. 2 shows a schematic diagram for the position of the SCM in the IMS mobile terminal protocol framework according to the invention.

FIG. 2 shows a schematic diagram for the position of the SCM in the IMS mobile terminal protocol framework according to the invention. As shown in FIG. 2, the SCM is in the Transmission Control Protocol (TCP) layer, the terminal internet protocol resource management module is in the Internet Protocol (IP) layer, and the signal strength automatic detection module is in the Access Layer Stack layer. Herein, the SCM is the dedicated switch control module for control the UE to complete the switch control with different systems. Through the interaction between the SCM and the terminal internet protocol resource management module and the signal strength automatic detection module in combination with the participation of the UE in the active switch control procedure, the loose coupling manner between the WiMAX system and the 3G core network can be changed into the changeable coupling manner, i.e, the coupling manner allowing the UE participating in the switch control, thereby realizing the efficient switch between the 3G system and the WiMAX system.

Figure 3:
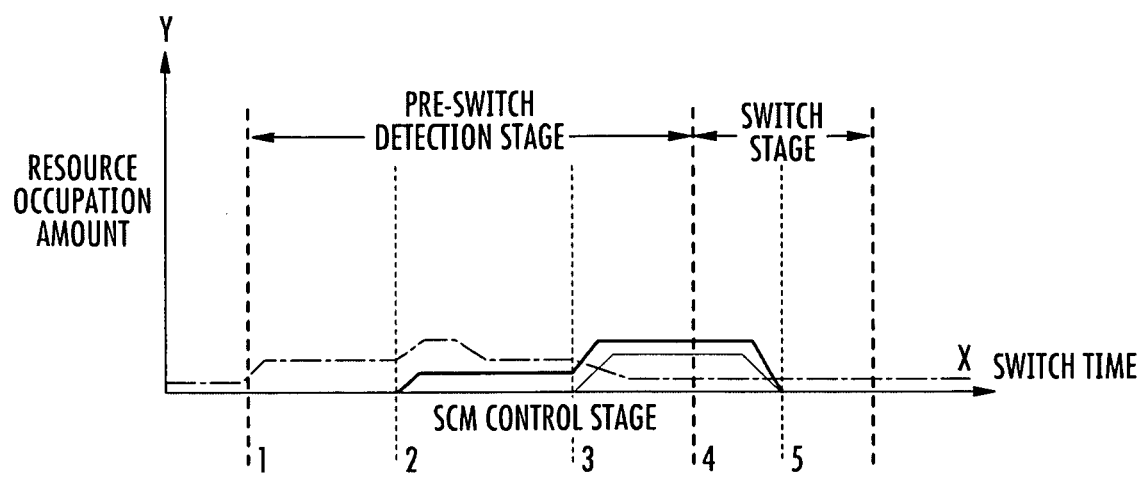
FIG. 3 shows a schematic diagram for the occupation situation of the main resources of the UE during the switch according to the invention.

FIG. 3 shows a schematic diagram for the occupation situation of the main resources of the UE during the switch according to the invention, in which the main resources of the UE refer to the buffer in the UE memory, the CPU for the switch control and the physical channel involved in the communication control and so on, and these resources cooperate under the control of the terminal management module. As shown in FIG. 3, the entire switch process is shown. The X axis represents the switch time, and the time axis is divided into four stages by the labeled time points for the convenience of the description. Herein, the period between the labeled time point 1-4 belongs to the pre-switch detection stage, and the period from the labeled time point 4 to the labeled time point 5 at the end of the switch and the subsequent period belong to the switch stage. The Y axis represents the resource occupation amount of the UE. Herein, the occupation situation of the terminal management module is represented as the dash and dot line, the occupation situation of the SCM is represented as the blackened thick line, i.e., the period between the time points 2-5, and the occupation situation of the terminal buffer is represented as the thin line, i.e., the period between the time points 3-5. According to the invention, through replacing some switch work in the terminal management module by the SCM, with the help of the active participation in the switch control of the SCM in the UE, the reservation, addition and cancellation of the UE buffer is fastened, while the interaction related to the control information between the UE and the access network is also reduced greatly.

The flow of the active participation in the switch control of the UE will be further described below with reference to the sequence of the time points labeled in FIG. 3, which comprises the following steps.

Step 1. When the UE receiving the 3G system signal is moving towards the WiMAX system, the UE detects that the quality of one or more signal of the base station of the WiMAX system has reached the signal quality of the 3G system, i.e., has entered the labeled time point 1, then the switch control flow enters the first stage status, the currently detected base stations of the WiMAX system are all listed into the activation set, and the detection for the signal on the downlink is continued.

Here, said activation set refers to the set of base stations that can switch from the 3G system to the WiMAX system.

As the difference between the strength of the two kinds of signals is still great at this time, the automatic detection will compare the several received signals periodically.

Step 2. When the detection process has lasted for a period, assuming it to be 10 seconds, the UE will obtain more ascertained signal quality detection parameters, then entering the labeled time point 2, i.e., entering the second stage of the switch control. At that time, there is already at least a signal of the base station of the WiMAX system in the activation set of which the signal quality is higher than the signal of the 3G system and the duration reaches a half of the trigger period, then the SCM is triggered into the switch flow, i.e., entering the predetermined SCM flow.

Here, said predetermined SCM flow refers to the entire process from the beginning of the act of the SCM to the completion of the switch operation in a complete switch flow.

Step 3. When the SCM detects that the signal quality of the base station of the WiMAX system is better than that of the 3G system and the duration reaches the specified trigger period, then the labeled time point 3 is entered, i.e., the third level status of the switch control is entered. At that time, the terminal management module transfers all the switch control rights to the SCM, and the SCM activates the original buffer reserved programs at the network side and the UE side. After the completion of the preparation for the buffer resources, it can be prepared to perform the switch operation.

The abovementioned manner of the terminal management module transferring all the switch control rights to the SCM is implemented by the way of increasing the priority of the management process for the switch control through the software settings.

Step 4. When the UE begins to switch formally, i.e., to enter the labeled time point 4, then under the control of the software of the predetermined SCM flow, the respective related modules in the UE begin to work and complete the control quickly through the interaction with the network side. After the switch, the labeled time point 5 will be entered, and the SCM will release all the public resource such as the buffer and so on, relieve the control of the respective related modules, and finish its own task.

The abovementioned respective related entities refers to the functional modules generally in charge of wireless resource management in the terminal management module (including the inter-module control process and the content of the respective signaling), which includes the dedicated control functional entity (DCFE) and the routing functional entity (RFE), etc.

The above are the four stages of the switch flow involved in a complete switch cycle of the invention. The next three stages, i.e., the implementation process of the predetermined SCM flow will be descript in detail in combination with the figures.

Figure 4:
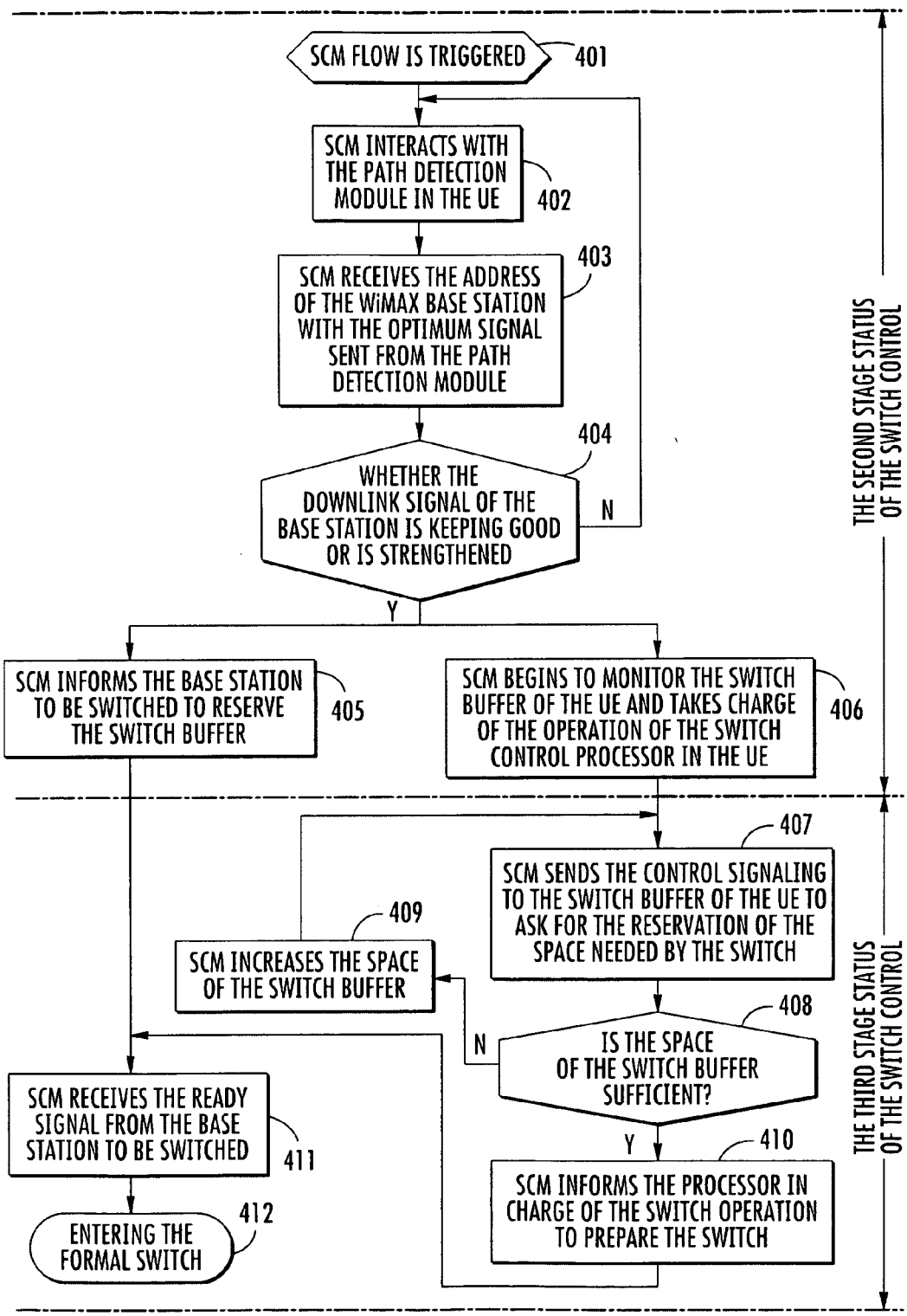
FIG. 4 shows a schematic diagram for the implementation procedure of the predetermined SCM flow according to the invention.

FIG. 4 shows a schematic diagram for the implementation procedure of the predetermined SCM flow according to the invention. As is shown in FIG. 4, the predetermined SCM flow comprises the two stages of the second level and the third level status of the switch control and the formal switch stage, wherein, the second level status is corresponding to the period between the labeled time points 2-3 in FIG. 3, the third level is corresponding to the period between the labeled time points 4-5 in the FIG. 3, and the formal switch stage is corresponding to the period between the labeled time point 4-5 in the FIG. 3. The concrete implementation of the method of the invention comprises the two parts shown in FIG. 4 and FIG. 5, wherein, step 401-406 belong to the second stage status of the switch control; step 407-412 belong to the third stage status of the switch control; step 501-509 belong to the formal switch stage.

The second level status stage of the switch control comprises the following steps.

Step 401. When the UE detects that the signal quality of the WiMAX system is better than that of the 3G system, there is already at least a signal of the base station of the WiMAX system in the activation set. When the signal quality of the base station of the WiMAX system is higher than the signal of the 3G system and the duration reaches a half of the specified trigger period, the SCM is triggered into the switch flow, i.e., into the predetermined SCM flow. Herein, the trigger period can be specified as 20 seconds.

Step 402. The SCM obtains the possible switch path that the UE may predict using the path prediction technology through the path prediction function of the UE, then the SCM is informed about the address of the base station of the WiMAX system of which the signal quality is optimum.

Step 403. The SCM receives the address of the base station of the WiMAX system of which the signal quality is optimum.

Step 404. The SCM receives the downlink signal of the base station mentioned in step 403, keeps a record and conducts comparison. The SCM decides whether the signal is keeping good or is strengthened continuously. If the signal is keeping good or is strengthened continuously, then process step 405 and 406; otherwise if the signal becomes more weak and less than the signal quality of the 3G system, then return to step 402, conduct the comparison again and reselect the base station of the WiMAX system of which the signal quality is optimum.

Step 405. The SCM informs said base station of the WiMAX system of which the signal quality is optimum to reserve the switch buffer.

Step 406. The SCM begins to monitor the switch buffer of the UE and the operation of the switch control processor in the UE and records the buffer size and to what degree that the processor operation is busy.

The abovementioned step 406 and step 405 are performed simultaneously with the following difference: the SCM sends instructions to the base stations at the WiMAX system side in step 405, while in step 406 the action of monitoring the switch buffer of the UE and the operation of the processor in the UE is performed by the SCM itself, in which said processor in charge of the switch control is the original processor in the UE.

In the third level status stage of the switch control, when the SCM detects that the signal quality of the base station of the WiMAX system is higher than the signal of the 3G system and holds for the specified trigger time period such as 20 seconds, the terminal management module of the UE stops the detection of the signal of the base station to be switched, and the signal detection and comparison will be performed by the SCM. Generally, this stage comprises the following steps.

Step 407. The SCM sends the control signaling to the switch buffer of the UE to ask for the reservation of the space required by the switch.

Step 408. The SCM decides whether the switch buffer space is sufficient, if the buffer space of the UE is not sufficient, then performing step 409; if there is sufficient space, then performing step 410.

Step 409. The SCM informs the CPU in charge of the switch control to increase the buffer space in memory immediately and returns to step 407.

The abovementioned control of the switch buffer is already taken charge of by the SCM, so the SCM has the priority which facilitates the respective operation for the buffer.

Step 410. The SCM informs the processor in charge of the switch operation to prepare the switch of the UE.

Step 411. The SCM receives the ready signal from the base station to be switched and the feedback signal from the processor in charge of the switch and performs step 412.

Step 412. The base stations at the UE side and the network side have completed the switch preparation, and then the switch stage will be entered.

Figure 5:
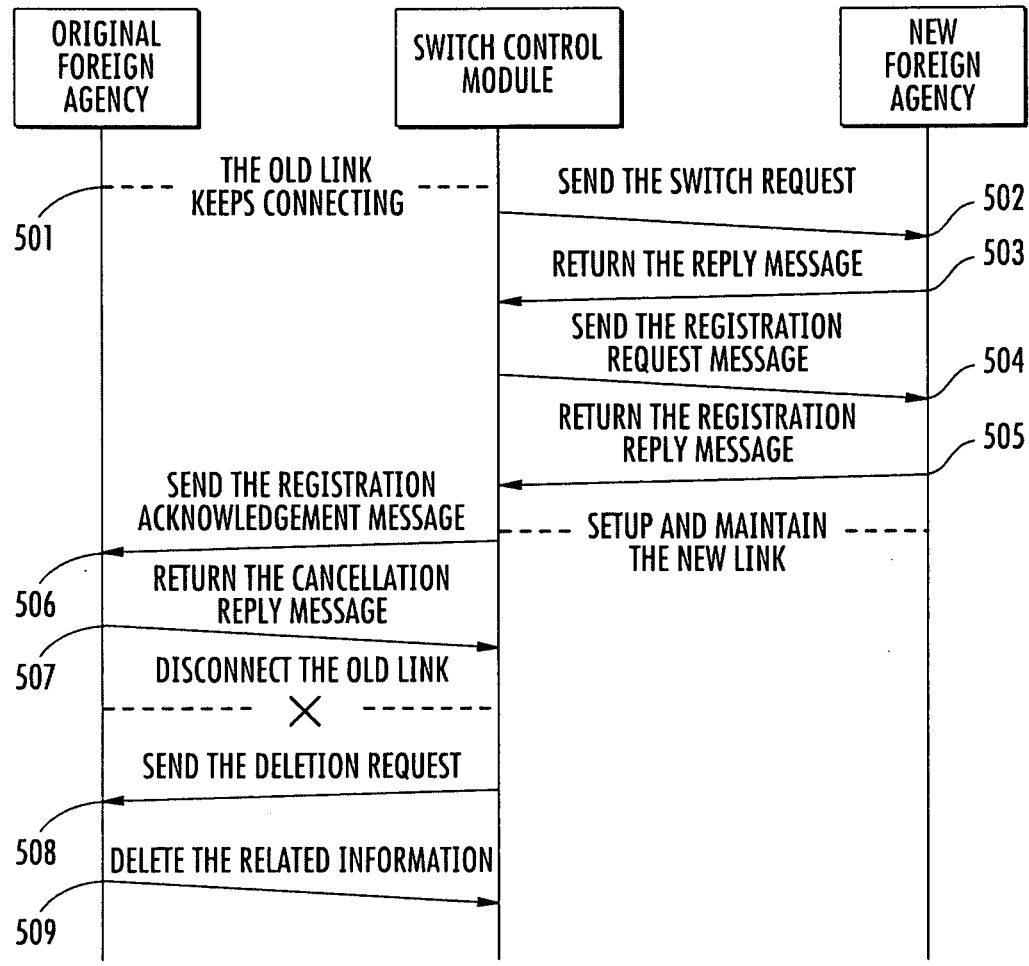
FIG. 5 shows a schematic flowchart for the signal transmission during the formal switch stage according to one embodiment of the invention.

FIG. 5 shows a schematic flowchart for the signal transmission during the formal switch stage according to one embodiment of the invention. Herein, the involved entities include: the pre-switch original Foreign Agent (FA), SCM and the post-switch new FA. As shown in FIG. 5, the process of the formal switch stage generally comprises the following steps.

Step 501. The SCM activates the switch function of the processor and saves the related information generated in the switch into the buffer. At that time, the link connection between the SCM and the original FA is maintained.

The abovementioned information refers to the identification information of the switch object and the scheduling information packet generated for completing the switch. The switch object can be the related information such as the service data packet being used by the UE before the switch, for example, the multimedia data packet in the video service, etc.

Step 502. The SCM sends the switch request to the new FA currently waiting for registration for entering the base station.

Here, said FA is in the base station at the network side currently to be registered and entered. Correspondingly, the FA in the base station in which the UE is currently located can be represented as the original FA, and the FA within the base station at the network side to be entered is represented as the new FA.

Step 503. The new FA returns the switch reply message to the SCM and the reply message includes the new Care-of Address (CoA).

The abovementioned naming of the CoA is similar to that of the FA, and the new CoA and the old CoA is comparatively speaking. If the UE switches from the 3G system to the WiMAX system, the new CoA is the WiMAX system side, the old CoA is the 3G system side; if the UE switches from the WiMAX system to the 3G system, the new CoA is the 3G system side and the old CoA is the WiMAX system side.

Step 504. The SCM sends the registration request message to the new FA to register the new CoA.

Said new FA is located in the base station at the WiMAX system side that the multi-mode UE is preparing to enter currently.

Step 505. After receiving the registration request, the new SCM which received the request returns a registration reply message to the SCM, sets up a new link and begins to transfer packets through the new link. At the same time, the data packets are continued to be transfer though the old link.

Step 506. After receiving the registration reply message, the SCM knows that the new link has been set up successfully, sends the registration acknowledgement message to the original FA to request to cancel the binding with the old CoA.

Step 507. After receiving the registration acknowledgement message, the original FA cancels the binding with the original CoA and sends the cancellation reply message to the SCM.

Step 508. After receiving the cancellation reply message from the FA, the SCM disconnects the old link and only receives the data packets on the new link.

Step 509. The SCM sends the deletion request to the original FA, and the original FA deletes the information related to the UE. So far, the entire switch process has been completed.

The switch process in the predetermined SCM flow of the invention is compatible with the proposal of WiMAX (named "WiMAX End-to-end Network Architecture"). Generally, when the switch control mode of the SCM is working in the loose coupling manner, in order to maintain the compatibility with the existing 3G/WLAN switch technology, the access layer and the mobile terminal part still adopt the existing dual-link switch technology to guarantee that the data won't be lost during the switch, the respective buffers are set for the access layer and the mobile terminal part, and the designed control signaling is coordinated. In this manner, the access layer and the UE part don't participate in the switch control but passively conduct the dual-link switch according to the control signaling. So the SCM can further add other functions related to the switch to realize the extensibility of the SCM functionality in the applications that have low requirements for the real-time performance.

The above is the method for switching of multi-mode UE from the 3G system to the WiMAX system, wherein, the 3G system can be represented as the first communication system and the WiMAX system can be represented as the second communication system. The respective switch is the switch from the WiMAX system to the 3G system, which is basically the same as the implementation principle and the implementation flow of the switch from the 3G system to the WiMAX system. In such a case, the WiMAX system is represented as the first communication system and the 3G system is represented as the second communication system.

The concrete situation of the switch of the multi-mode UE from the WiMAX system to the 3G system is as follows. When the signal strength of the base station of the WiMAX system becomes weak or disappear completely, the UE will detect automatically the signal strength change of the 3G system. When it reaches the switch condition, the predetermined SCM flow is activated to conduct automatic switch. The concrete process is basically consistent with that of the switch of the UE from the 3G system to the WiMAX system, other than the difference of the signal parameters transferred during the switch flow. This switch process is just a reverse process for the same implementation of the invention and has little difference from the process of the switch of the UE from the 3G system to the WiMAX system, so the description for the details will be omitted here.

The foregoing description gives only the preferred embodiments of the present invention and is not intended to limit the present invention in any way.

What is claimed is:

1. A method for controlling switching of mobile user equipment, characterized in a dedicated switch control module SCM is provided, the method comprising steps of:
   a. listing, into an activation set by a UE, an identification of a base station of a second communication system of which a currently detected signal quality reaches that of a first communication system; deciding whether there is at least a base station of the second communication system in the activation set, of which the signal quality is better than that of the signal of the base station of the first communication system and the duration of the signal quality reaches a half of a predetermined trigger period, if yes, then performing step b; otherwise continuing to detect the signal periodically and returning to step a;
   b. deciding whether the signal quality of the base station of the second communication system detected by the SCM is better than that of the signal of the base station of the first communication system and whether the duration of the signal quality reaches a specified trigger period, if yes, then transferring all switch control rights from a terminal management module to the SCM, preparing buffer resources by the SCM and performing step C; otherwise continuing to detect the signal periodically and returning to step b;
   c. triggering and completing the switch by the SCM, releasing the occupied public resources in time by the SCM after the switch is finished, and relieving the control for all the modules related to the switch,
   wherein said step a generally comprises:
   a1. detecting by the UE the signal of the base station of the second communication system, saving into the activation set the identification of the base station of the second communication system of which the signal quality is higher than that of the first communication system, if there is already at least an identification of the base station of the second communication system in the activation set and the signal quality of the base station of the second communication system is higher than that of the signal of the first communication system and the duration reaches a half of a specified trigger period, then triggering the SCM to go into a predetermined SCM flow;
   a2. informing the SCM about the obtained address of the base station of the second communication system which has the optimum signal, and selecting the address of the base station of the second communication system which has the optimum signal by the SCM;
   a3. receiving a downlink signal of said base station in step a2 by the SCM, keeping a record and making a comparison, deciding whether the signal keeps good or is strengthened continuously, if yes, then processing step a4; otherwise returning to step a2;
   a4. informing the base station of the second communication system which has the optimum signal to reserve a switch buffer by the SCM, beginning to monitor the switch buffer of the UE
   and the operation of the switch control processor in the UE by the SCM, and recording the buffer size and to what extent that the processor operation is busy.

2. The method for controlling switching of mobile user equipment according to claim 1, wherein
   said SCM is set in a TCP layer of an IMS mobile terminal protocol;
   the SCM completes the switch with the help of control effect of the terminal IP resource management module of the IMS mobile terminal protocol IP layer and the detection effect of the signal strength automatic detection module of the access layer stack.

3. The method for controlling switching of mobile user equipment according to claim 1, wherein said transferring the switch control rights from the terminal management module to the SCM in step b generally comprises:
   b1. sending a control signaling from the SCM to the switch buffer of the UE to ask for reserve the space needed by the switch;
   b2. deciding whether the switch buffer space for the UE is sufficient by the SCM, if the buffer space of the UE is not sufficient, then performing step b3; if the space is sufficient, then performing step b4;
   b3. informing the CPU in charge of the switch control to increase the buffer space set in the memory by the SCM immediately, and returning to step b 1;
   b4. informing the processor in charge of the switch operation to prepare the switch of the UE by the SCM;
   b5. after receiving a ready signal from the base station to be switched and the feedback signal from the processor in charge of the switch, performing step b6;
   b6. after the base stations at the UE side and the network side have completed the switch preparation, entering a switch stage.

4. The method for controlling switching of mobile user equipment according to claim 1, wherein said the triggering and completing the switch by the SCM in step c generally comprises:
   c1. activating the switch function of the processor by the SCM and saving the related information generated in the switch into the buffer;
   c2. sending a switch request from the SCM to a new Foreign Agent currently waiting for registration and entrance, and returning a switch reply message including a new care-of address CoA from the new FA to the SCM;
   c3. sending the registration request message from the SCM to the new FA to register the new CoA, returning a registration reply message from the new FA which has received the registration request message to the SCM, setting up a new link, beginning to transfer packets through the new link and continuing to transfer packets through an old link;
   c4. after receiving the registration reply message returned from the new FA to the SCM, knowing that the new link has been set up successfully, sending a registration acknowledgement message to the original FA to request to cancel the binding with the original CoA, canceling the binding with the original CoA and send a cancellation reply message from the original FA to the SCM upon receiving the registration acknowledgement message;
   c5. after receiving the cancellation reply message from the original FA to the SCM, disconnecting the old link and only receiving data packets on a new link, sending a deletion request to the original FA, and deleting information related to the UE by the original FA.

5. The method for controlling switching of mobile user equipment according to claim 1, wherein said first communication system is a 3G system and said second communication is a WiMAX system; or otherwise, said first communication system is the WiMAX system and said second communication system is the 3G system.

* * * * *